March 5, 1940.                C. GREEN                2,192,469
                      AIRPLANE PROPULSION MEANS
                        Filed June 9, 1939         2 Sheets-Sheet 1
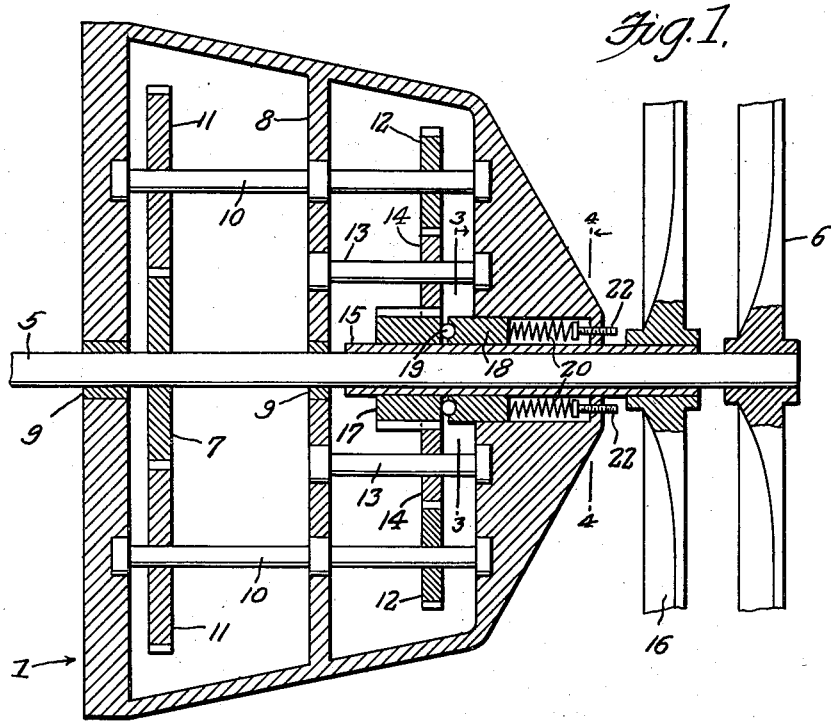
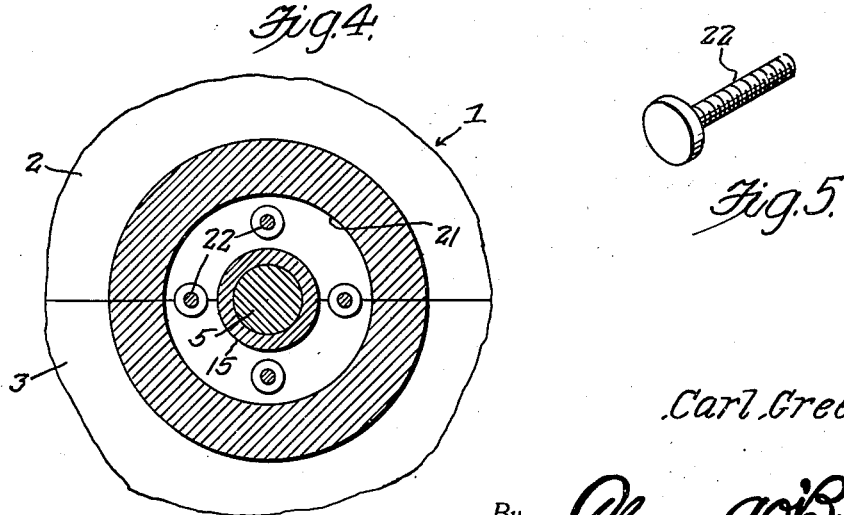
Inventor
Carl Green
By *Clarence A. O'Brien*
and *Hyman Berman*
Attorneys March 5, 1940.   C. GREEN   2,192,469
AIRPLANE PROPULSION MEANS
Filed June 9, 1939   2 Sheets-Sheet 2

Inventor
Carl Green.

By Clarence A. O'Brien
and Hyman Berman
Attorneys

Patented Mar. 5, 1940

2,192,469

UNITED STATES PATENT OFFICE 2,192,469

AIRPLANE PROPULSION MEANS

Carl Green, Eversole, Ky., assignor of one-half to Tilmon J. Green, Eversole, Ky.

Application June 9, 1939, Serial No. 278,367

1 Claim. (Cl. 170—135.5)

The present invention relates to new and useful improvements in airplane propulsion means and has for its primary object to provide, in a manner as hereinafter set forth, an apparatus of this character comprising a pair of oppositely rotating propellers whereby the efficiency of the power plant will be materially increased.

Another very important object of the invention is to provide an airplane propulsion means of the aforementioned character comprising a yieldable thrust bearing whereby longitudinal movement of one of the propellers toward and away from the other will be permitted.

Other objects of the invention are to provide an airplane propulsion means of the character described which will be comparatively simple in construction, strong, durable, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in vertical longitudinal section through an embodiment of the invention.

Figure 4 is a cross sectional view, taken substantially on the line 4—4 of Fig. 1.

Figure 5 is a detail view in perspective of one of the thrust bearing adjusting screws.

Figure 2:
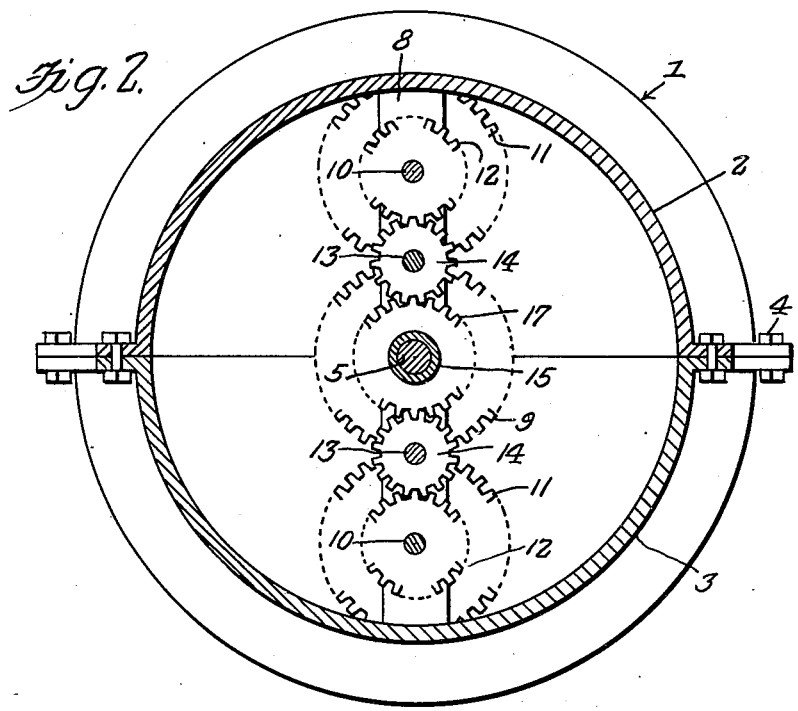
Figure 2 is a view in cross section therethrough.
Figure 3:
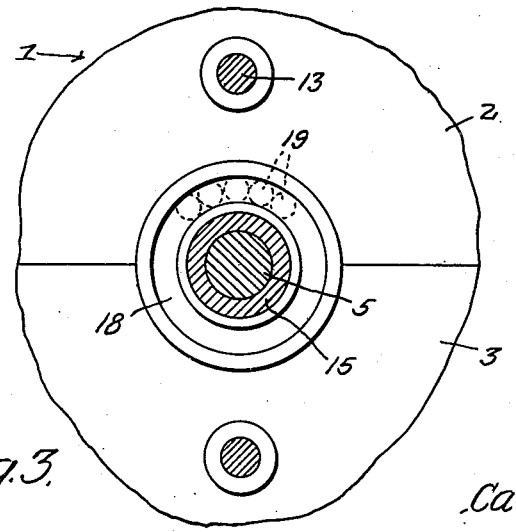
Figure 3 is a detail view in cross section, taken substantially on the line 3—3 of Fig. 1.

Referring now to the drawings in detail, it will be seen that the embodiment of the invention which has been illustrated comprises a housing of suitable metal which is designated generally by the reference numeral 1, said housing being of substantially the longitudinal shape shown to advantage in Fig. 1 of the drawings. The housing 1 is for the reception of a suitable lubricant and said housing includes complemental half sections 2 and 3 which are bolted together, as at 4 (see Fig. 2).

Journaled in the housing 1 and extending longitudinally therethrough is a shaft 5 which is driven by the engine (not shown) of the airplane. Fixed on the forward end portion of the shaft 5 is a propeller 6. The reference numeral 7 designates a gear which is fixed on the shaft 5 in the rear portion of the housing 1. A vertical supporting bar 8 is provided at an intermediate point in the housing 1 through which the shaft 5 extends. Suitable bearings 9 are provided in the housing 1 for the shaft 5. The reference numeral 10 designates countershafts which are journaled in the housing 1. Fixed on the rear portions of the countershafts 10 are gears 11 which are driven by the gear 7. Fixed on the forward portions of the countershafts 10 are comparatively small gears 12.

The reference numeral 13 designates comparatively short countershafts which are journaled in the forward portion of the housing 1 between the shaft 5 and countershafts 10. Reversing gears 14 are mounted on the countershafts 13. Gears 14 are driven by the gears 12.

Journaled in the forward portion of the housing 1 and rotatably and slidably mounted on the shaft 5 is a tubular shaft 15. Fixed on the forward end portion of the shaft 15 is a propeller 16. Fixed on the rear portion of the tubular shaft 15 is a comparatively long gear 17 which is driven by the gears 14.

The tubular shaft 15 is rotatably and slidably mounted in a combination radial and thrust bearing 18 which is provided therefor in the forward portion of the housing 1. Antifriction balls 19 are interposed between the bearing 18 and gear 17. Forward sliding movement of the bearing 18 is yieldingly resisted by coil springs 20 which are mounted in a chamber 21 provided therefor in the forward portion of the housing 1. One end of the coil springs 20 is engaged with adjusting screws 22 which are threadedly mounted in the forward portion of the housing 1 and through the medium of which the tension of said coil springs may be regulated. It will be noted that the headed ends of the screws 20 are located in the chamber 21 for engagement by the coil springs 20.

It is thought that the operation of the apparatus will be readily apparent from a consideration of the foregoing. The front propeller 6 on the shaft 5 is rotated in one direction by the engine. Through the gears 7, 11, 12, 14 and 17 the propeller 16 on the tubular shaft 15 is driven in the opposite direction at the same speed. The coil springs 20 of the bearing 18 permit longitudinal movement of the propeller 16 toward and away from the front propeller 6. Of course, during this longitudinal movement of the propeller 16 the comparatively long gear 17 remains in mesh with the gears 14.

It is believed that the many advantages of an airplane propulsion means constructed in accordance with the present invention will be readily understood and although a preferred embodiment of the apparatus is as illustrated and described, it is to be understood that changes in the details of construction and in the combination and arrangement of parts may be resorted to which will fall within the scope of the invention as claimed.

What is claimed is:

An airplane propulsion means comprising a housing, a shaft extending rotatably through said housing, a propeller fixed on said shaft, a tubular shaft rotatably and slidably mounted on the first named shaft, a propeller fixed on said tubular shaft, means including a gear on the tubular shaft operatively connecting the tubular shaft to the first named shaft for actuation thereby in the opposite direction relative thereto, and means in the housing for yieldingly resisting forward longitudinal movement of the tubular shaft on the first named shaft, said last named means comprising a radial bearing rotatably and slidably mounted on the tubular shaft, a thrust bearing supported by said radial bearing, coil springs mounted in the housing and engaged with the bearing for yieldingly resisting forward movement thereof, and means threadedly mounted in the housing for adjusting the tension of said coil springs.

CARL GREEN.